Dec. 23, 1958 R. FARWELL 2,865,160
MECHANICAL MOWER
Filed July 16, 1957 3 Sheets-Sheet 3
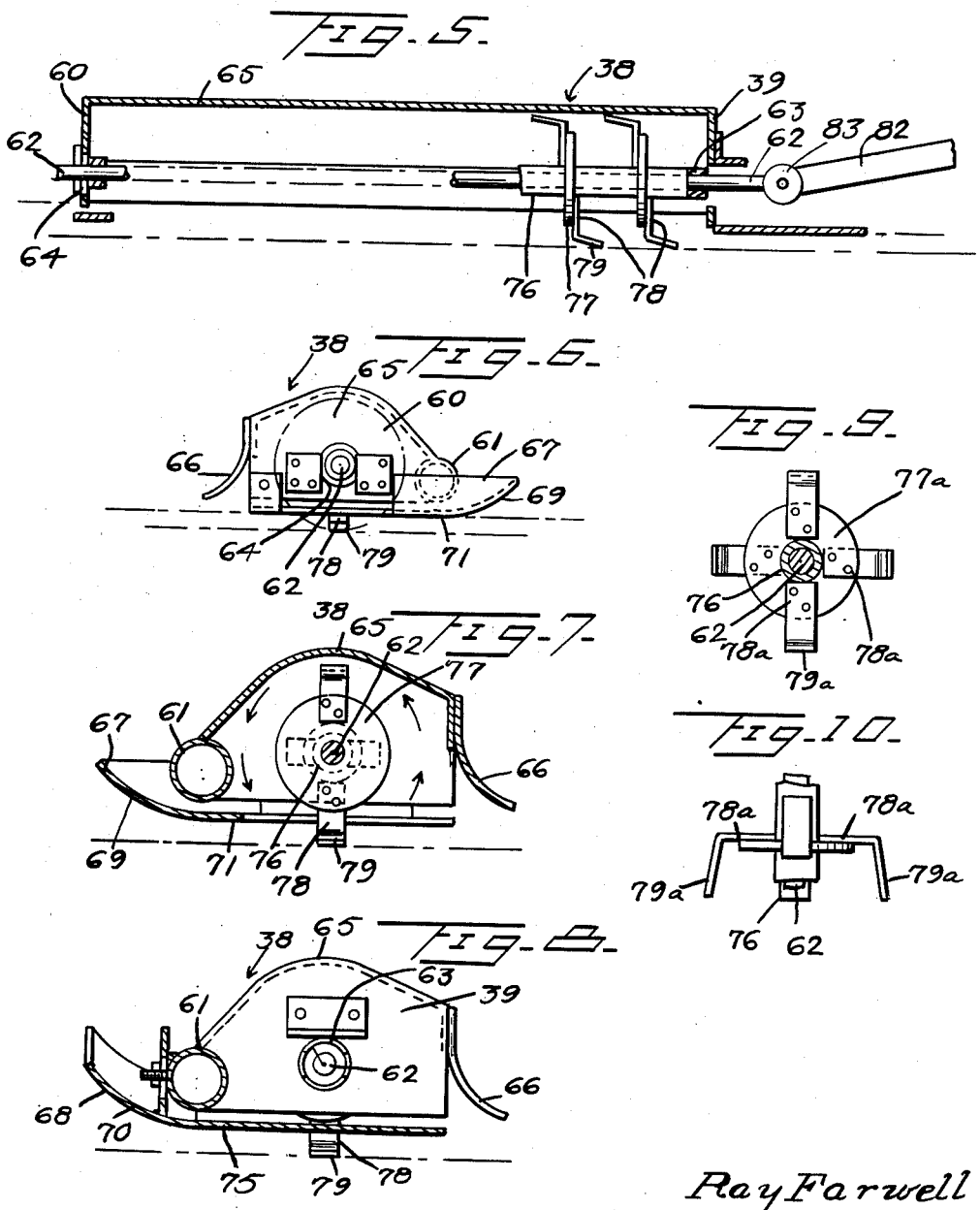
Ray Farwell
INVENTOR
BY Snow & Co.
ATTORNEYS.

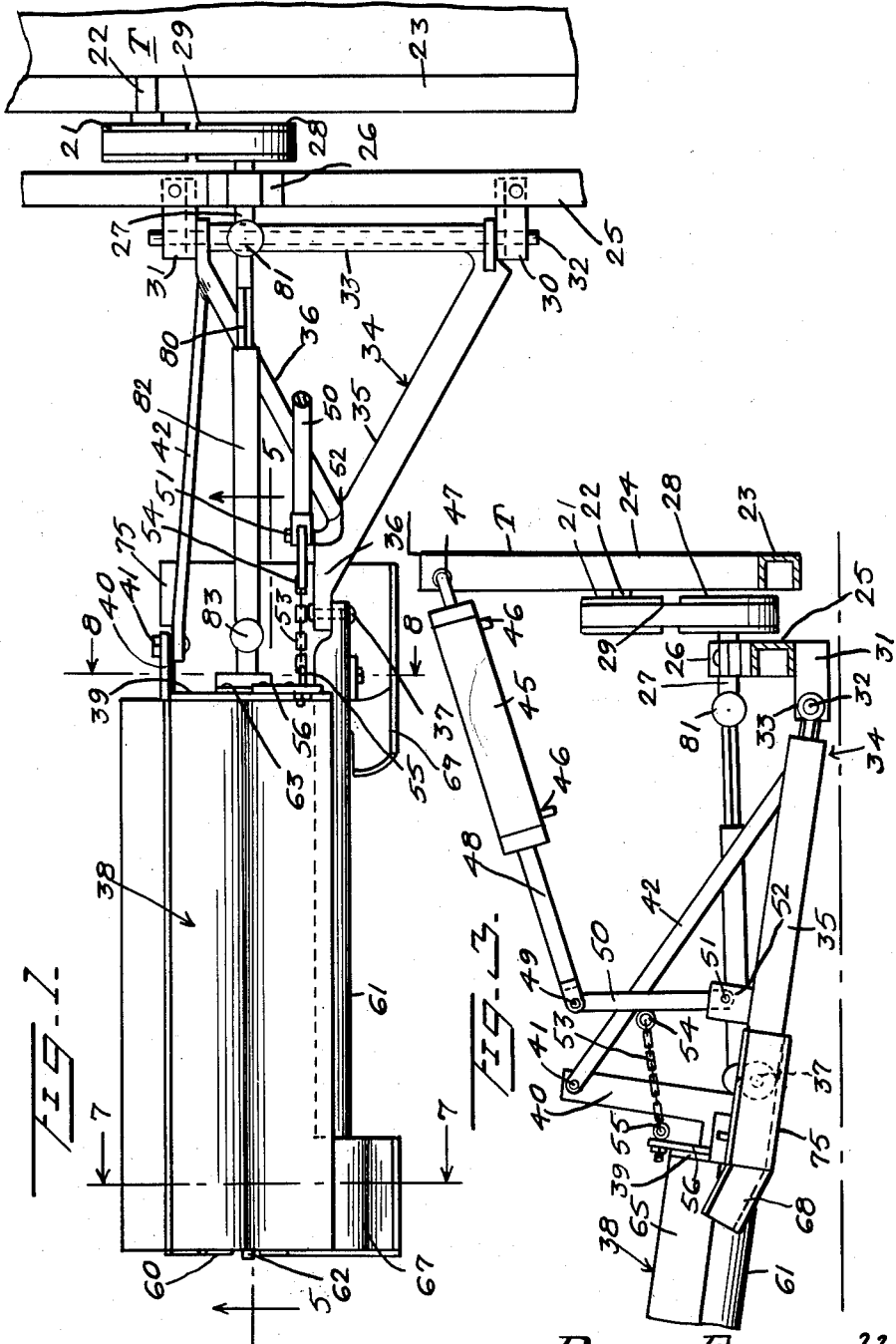

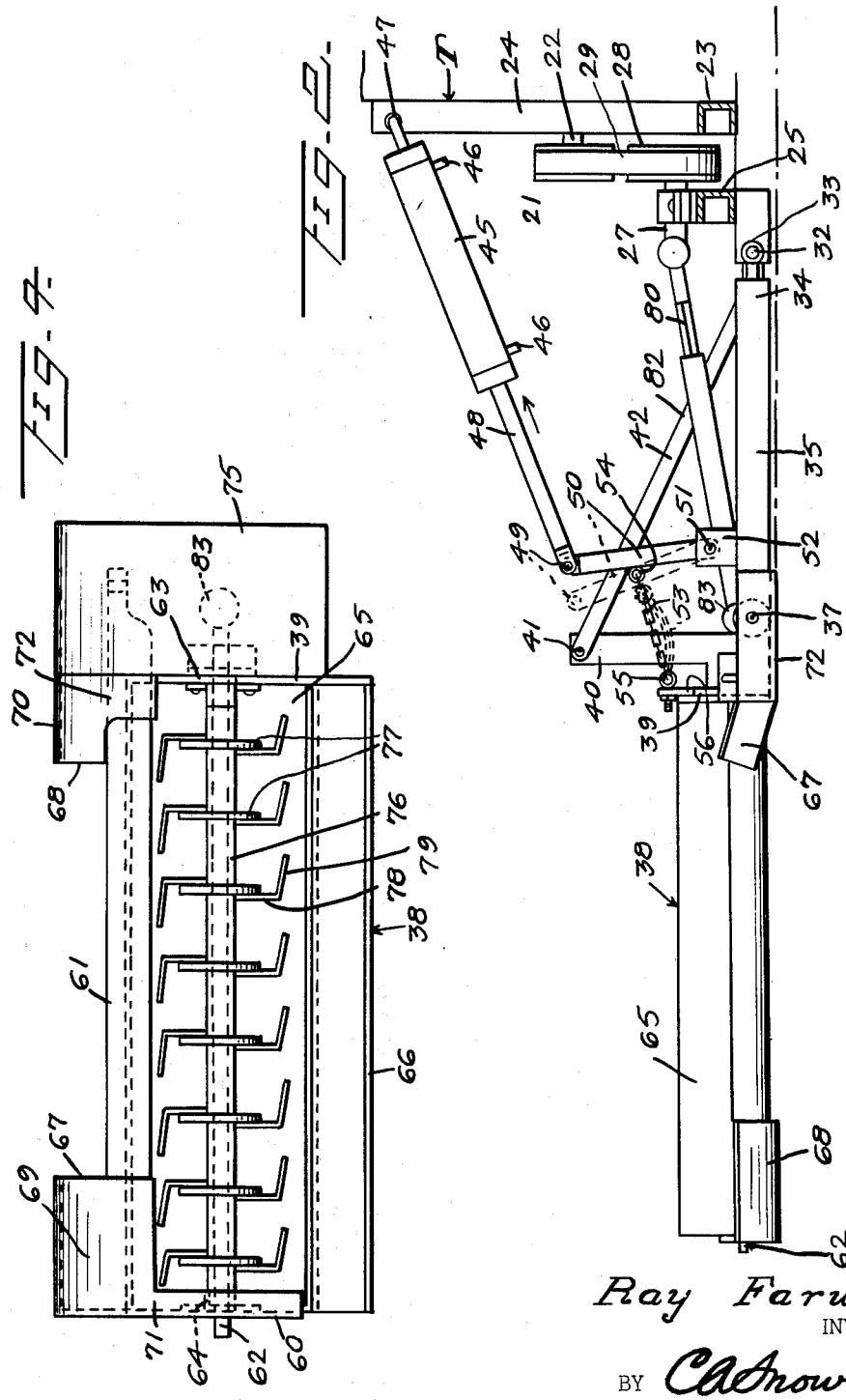

United States Patent Office 2,865,160
Patented Dec. 23, 1958

2,865,160

MECHANICAL MOWER

Ray Farwell, Zolfo Springs, Fla.

Application July 16, 1957, Serial No. 672,271

2 Claims. (Cl. 56—26)

This invention relates to a mechanical mower on hoe, and more particularly to a device for hoeing the ground around citrus fruit trees.

A primary object of this invention is the provision of an improved mechanical hoe of this nature, but which also has general utility in hoeing ground for any purpose, which is particularly capable of adaptation to the contour of the ground, even though the ground level at the outer end of the mechanical hoe be below the center line of the apparatus.

An additional object of the invention is the provision of a device of this character which will freely raise and lower about a pivot point, in accordance with the contour of the ground, without effecting the driving mechanism of the device.

Still another object of the invention is the provision of a device of this character which may be readliy and effectively raised to inoperative position, and the provision of means whereby the outer end of the cutting head is always raised first, regardless of its relative position to the pivot point of the inner end of the head.

Still another object of the invention is the provision of a device of this character which may be driven by a pulley drive directly from the side pulley wheel of a tractor, thus eliminating the necessity of a gear drive for the apparatus.

Still another object of the invention is the provision of an improved mounting means for the cutter head in association with the tractor or the like, whereby the same may be readily assembled and disassambled relative to the tractor.

A further object of the invention resides in the provision of an improved hoe or hoeing head per se.

Still another object of the invention resides in the provision of a device of this character which is sturdy and durable in construction, reliable and efficient in operation, and relatively simple and inexpensive to manufacture assemble and utilize.

Still other objects reside in the combinations of elements, arrangements of parts, and features of construction. Other objects will in part be pointed out hereinafter, and in part be shown in the accompanying drawings wherein there is illustrated a preferred embodiment of this inventive concept.

In the drawings:

Figure 1 is a top plan view of one form of mechanical hoe embodying features of the instant invention shown in association with the tractor, the latter being shown fragmentarily, partially in section.

Figure 2 is a front elevational view of the construction of Figure 1, with parts in section.

Figure 3 is a view similar to Figure 2, parts thereof being broken away, in a different position of adjustment, with parts in section.

Figure 4 is an enlarged bottom plan view of the hoeing head disassociated from its lifting mechanism.

Figure 5 is a sectional view taken substantially along the line 5—5 of Figure 1 as viewed in the direction indicated by the arrows.

Figure 6 is an end elevational view of the hoeing head of Figure 1 as viewed from the left.

Figure 7 is an enlarged sectional view taken substantially along the line 7—7 of Figure 1 as viewed in the direction indicated by the arrows.

Figure 8 is an enlarged sectional view taken substantially along the line 8—8 of Fig. 1 as viewed in the direction indicated by the arrows.

Figure 9 is an end elevational view of a modified form of cutting blade, partially in section.

Figure 10 is a top plan view of the cutting blade disclosed in Figure 9.

Similar reference characters refer to similar parts throughout the several views of the drawings.

Having reference now to the drawings in deail T generally indicates a fragment of a tractor of any desired conventional type, which is provided with a side drive pulley 21, and a drive shaft 22, which is driven by the tractor motor in a conventional manner. The portion of the tractor of pertinence to the instant invention comprises a side frame channel bar 23, and an upright channel bar 24. These may either be standard equipment of the tractor, or added thereto, as necessary.

A supplemental channel bar 25 is suitably secured to the tractor frame in parallelism with the channel bar 23 in any desired conventional manner, and carries a bracket 26, in which is rotatably mounted a shaft 27, which carries a pulley 28, which is connected by a belt 29 with the side drive pulley 21 of the tractor. Thus the shaft 27 is driven from the power drive of the tractor, for a purpose to be more fully described hereinafter.

The channel bar 25 carries a pair of outwardly projecting lugs 30 and 31, apertured to receive the ends of a shaft 32, which extends therebetween. The shaft 32 is surrounded by a sleeve 33, which comprises part of a yoke generally indicated at 34. The yoke 34 comprises a main lifting beam 35 and a supplemental beam 36, serving as a reinforcement therefor and converging to form a Y. The stem 36 of the Y-shaped yoke has pivotally connected thereto as by a pivot 37 a cutter head assembly generally indicated at 38. The cutter head assembly includes a frame having an end piece 39, from one side of which, opposite the side pivoted as at 37, includes a lug 40, which is pivotally connected by means of a pivot 41 to an arm 42, which is integrally connected to the leg 36, for swinging movement therewith. As best shown in Figures 2 and 3 the lug 40 extends upwardly a substantial distance above the pivotal connection 37. It will thus be seen that the cutter head is free to pivot about pivot 37, in order to conform to the ground contour, while the entire assembly, including the yoke 34 may be pivoted about the rod 32, to raise the cutter head to inoperative position. Means are provided for effecting the raising of the cutter head, and take the form of a hydraulic cylinder 45, suitably supplied with actuating fluid from any desired source through tubes 46, the cylinder being pivotally connected as by a pivot 47 to the upright 24 at a point well above the cutter head assembly. The cylinder 45 contains the conventional piston, which is adapted to actuate a piston rod 48, which is pivotally connected as by a pivot 49 to a link 50, the other end of the link being pivoted as by a pivot 51 to a lug 52 which is fixedly secured to the arm 35.

A short length of chain 53 extends between an eye 54 mounted intermediately of the link 50 and an eye 55 carried by a lug 56 secured to the end plate 39 of mower head 38.

It will thus be seen that when the piston rod 48 is withdrawn from the hydraulic cylinder 45 the link 50 is pulled rearwardly, which takes up any slack in chain 53, and first exerts a pull on the mower head 38, to raise the outer end in an arc as indicated by the arrows in Figures 2 and 3. Thus the outer end of the mower head is lifted first regardless of its relative position, whether level with the yoke 34 or below or above the same according to the contour of the ground. The slack in the chain 53 during normal operations permits adaptation of the mower head to the ground contour. As the withdrawal of piston rod 48 continues, the entire assembly including the yoke 34 is lifted off the ground, and elevated to a suitable extent thereabove. The mower head 38 may then be swung manually if desired after a suitable elevation is reached to a vertical position for transportation.

The cylinder 45 is disclosed in Figures 2 and 3, but is omitted in Figure 1 for the sake of clarity.

Referring now to the mower head detail, it will be seen that the same is comprised of a frame including the end plate 39, and an opposite end plate 60, the two being connected by a tubular front frame member 61. A shaft 62 extends between plates 39 and 60, and is suitably journalled in journals 63 and 64 carried by the plates 39 and 60 respectively. The entire frame is covered by a housing 65, which is open at its rear end, and provided with a deflector plate 66 which extends the full length thereof. This serves as a guide to prevent flying of the cut material.

Guide and deflector members 67 and 68 respectively are provided at opposite ends of the cutter head adjacent the forward edge thereof, and include arcuate under surfaces 69 and 70 respectively, and partial bottom plates 71 and 72 respectively. The plate 68 also includes a skirt 75, which extends outwardly a substantial distance from the end 39 of the mower head.

The shaft 62 carries a plurality of rotatable cutting blades, which are carried by a sleeve 76 surrounding shaft 62 and rotatable therewith. Each cutter blade comprises a center portion 77 fixed to the shaft and a L-shaped blade, including a leg 78 which is affixed to the center plate 77, and an obliquely disposed cutting blade portion 79, the latter being substantially horizontal to the ground to effect the actual cutting action. It is to be noted that, as best shown in Figures 4 and 5 each central disk 77 is provided with a pair of cutting blades, the cutting edges 79 of the blades of each disk being oppositely disposed relative to each other.

A slightly modified form of construction is shown in Figure 9, wherein a central disk 77a adapted for mounting on the sleeve 76 on shaft 62 is provided with two pairs of oppositely disposed blades, each comprised of an L-shaped blade including a portion 78a adapted to be affixed directly to the disk 77a, and an angularly disposed portion 79a extending therefrom. The blades per se are substantially identical to those previously described, the only difference lying in the number of such blades.

Power for rotating the shaft 62, and hence the cutters 79 is provided through a shaft 80, which is universally connected as by universal joint 81 to drive shaft 27 previously described. The shaft 80 slidably engages in a sleeve 82, to permit suitable pivotal movement of the apparatus, and is drivingly connected thereto in any desired manner, as by a tongue and groove. The sleeve 82 is in turn connected by a universal joint 83 to the inner end of the drive shaft 62, in such manner that the shaft 62 and its associated cutters are rotated directly by the belt pulley arrangement previously described, power being supplied from the conventional side pulley 21 of the tractor.

From the foregoing the operation of the device should now be readily understandable. When it is desired to mow a particular locality the mower head is lowered into position level with the ground, and the tractor side pulley 21 is energized to rotate the shaft, the mowing being thus effected by the blades 79. The pivot 37, together with the chain 53 permits relative pivotal movement of the mower head to conform to the contour of the ground, the outer end of the head moving either upwardly or downwardly in accordance with the particular contour. When it is desired to raise the mower head, the hydraulic cylinder 45 is actuated in a manner previously described, and through piston rod 48 lever 50 and chain 53 the outer end of the mower head is raised in an arc as previously described first, and then the yoke assembly 35 correspondingly raised to lift the entire assembly from the ground.

From the foregoing it will now be seen that there is herein provided an improved mechanical hoe or mower, which accomplishes all of the objects of this invention, and other, including many advantages of great practical utility and commercial importance.

As many embodiments may be made of this inventive concept, and as many modifications may be made in the embodiment herein before shown and described, it is to be understood that all matter herein is to be interpreted merely as illustrative and not in a limiting sense.

I claim:

1. A mower attachment for a tractor having a frame including a horizontal frame member, a vetrical frame member extending from said horizontal frame member and a side power pulley adjacent said frame, a second horizontal frame member secured in parallelism to said first mentioned horizontal frame member, a yoke pivotally connected at its inner end to said second horizontal frame member extending laterally from the side of said tractor, a mower head pivotally connected to the outer end of said yoke, a support for the outer end of said head, a rotatable mower in said head, connections between said mower and said side pulley, power lift mechanism carried by said vertical frame member above said horizontal frame member, a link pivoted to the outer end of said yoke, a pivotal connection between said link and said power lift mechanism, and a flexible chain connection between an intermediate portion of said link and the inner end of said mower housing for raising and lowering the outer end of said mower above and below the horizontal in accordance with the contour of the ground, said chain being of a length sufficient to allow lowering of the outer end of the mower below the horizontal.

2. The construction of claim 1 wherein the connection between said side pulley and said mower head includes a second pulley driving said rotatable mower and a belt connection between said second pulley and said side pulley, and wherein a first shaft extends from said second pulley, a second shaft is universally connected to said first shaft, a sleeve is drivingly engaged by said second shaft, said mowers provided with a rotatable shaft carrying cutters, and a universal connection is provided between said sleeve and said rotatable shaft.

References Cited in the file of this patent

UNITED STATES PATENTS

| | | |
|---|---|---|
| 1,846,459 | Romera | Feb. 23, 1932 |
| 2,465,405 | Strawn | Mar. 29, 1949 |